United States Patent
Pann et al.

(10) Patent No.: US 12,368,954 B2
(45) Date of Patent: Jul. 22, 2025

(54) CAMERA SYSTEM, MOBILE DEVICE AND METHOD OF OPERATING A MOBILE DEVICE FOR MULTI-FOCUS IMAGING

(71) Applicant: ams-OSRAM AG, Premstaetten (AT)

(72) Inventors: Peter Pann, Graz (AT); Alexander Pann, Graz (AT)

(73) Assignee: AMS-OSRAM AG, Premstaetten (AT)

( * ) Notice: Subject to any disclaimer, the term of this patent is extended or adjusted under 35 U.S.C. 154(b) by 204 days.

(21) Appl. No.: 18/253,802

(22) PCT Filed: Nov. 23, 2021

(86) PCT No.: PCT/EP2021/082669
§ 371 (c)(1),
(2) Date: May 22, 2023

(87) PCT Pub. No.: WO2022/106720
PCT Pub. Date: May 27, 2022

(65) Prior Publication Data
US 2024/0007747 A1   Jan. 4, 2024

(30) Foreign Application Priority Data
Nov. 23, 2020 (DE) .................. 10 2020 130 873.6

(51) Int. Cl.
*H04N 23/67* (2023.01)
*G06T 5/50* (2006.01)
*G06T 7/11* (2017.01)

(52) U.S. Cl.
CPC ............. *H04N 23/676* (2023.01); *G06T 5/50* (2013.01); *G06T 7/11* (2017.01); *G06T 2207/10024* (2013.01); *G06T 2207/20221* (2013.01)

(58) Field of Classification Search
CPC .... H04N 23/676; H04N 23/67; H04N 23/957; G06T 5/50; G06T 7/11; G06T 2207/10024; G06T 2207/20221
See application file for complete search history.

(56) References Cited

U.S. PATENT DOCUMENTS 9,485,407 B2 * 11/2016 Tsai .................. H04N 23/959
2006/0050409 A1   3/2006 George et al.
(Continued)

FOREIGN PATENT DOCUMENTS

CN    103336359 A   10/2013
CN    208999587 U    6/2019
(Continued)

OTHER PUBLICATIONS

Benzeroual, K. International Search Report and Written Opinion dated Mar. 3, 2022, PCT Application No. PCT/EP2021/082669, 6 pages.
(Continued)

*Primary Examiner* — Gevell V Selby
(74) *Attorney, Agent, or Firm* — MH2 Technology Law Group LLP

(57) ABSTRACT

In at least one embodiment a camera system includes a multi-focus lens, an image sensor and an image processor. The multi-focus lens has a first focal length and a second focal length. The image processor is arranged downstream of the multi-focus lens. In operation, the image sensor generates a combined image according to the first and second focal lengths of the multi-focus lens. The image processor receives the combined image and separates the combined image into a first image of the first focal length and a second image of the second focal length.

15 Claims, 4 Drawing Sheets

(56) References Cited

U.S. PATENT DOCUMENTS

| | | |
|---|---|---|
| 2008/0079839 A1 | 4/2008 | Sung et al. |
| 2008/0305828 A1 | 12/2008 | Chang et al. |
| 2010/0155477 A1 | 6/2010 | Nadabar et al. |
| 2012/0293705 A1* | 11/2012 | Su .................... H04N 23/69 348/345 |
| 2014/0139721 A1 | 5/2014 | Choi |
| 2015/0009395 A1* | 1/2015 | Ono .................... H04N 23/67 348/360 |
| 2015/0062370 A1* | 3/2015 | Shroff ................ H04N 23/676 348/222.1 |
| 2015/0156478 A1 | 6/2015 | Ono |
| 2015/0294472 A1 | 10/2015 | Putraya et al. |
| 2016/0377842 A1 | 12/2016 | Choi et al. |
| 2018/0054569 A1 | 2/2018 | Griffin et al. |
| 2019/0191142 A1 | 6/2019 | Boisson et al. |

FOREIGN PATENT DOCUMENTS

| | | |
|---|---|---|
| CN | 110286473 A | 9/2019 |
| CN | 210072174 U | 2/2020 |
| DE | 102011017355 A1 | 10/2012 |
| EP | 2075630 A1 | 7/2009 |
| JP | 1239515 A | 9/1989 |

OTHER PUBLICATIONS

Xian-Chuan, Y. et al.: "A new blind image source separation algorithm based on feedback sparse component analysis" Signal Processing vol. 93, Issue 1, Jan. 2013, pp. 288-296.

Hoshen, Y.: "Towards Unsupervised Singlechannel Blind Source Separation Using Adversarial Pair Unmix-and-remix" ICASSP, May 16, 2019, IEEE International Conference on Acoustics, Speech and Signal Processing (ICASSP), 5 pages.

Leswing, K. The $999 iPhone X is estimated to include less than $400 in parts, Insider, Feb. 16, 2021, 6 pages, https://www.businessinsider.de/iphone-xteardown-parts-cost-ihs-markit-2017-11?r=US&IR=T.

* cited by examiner

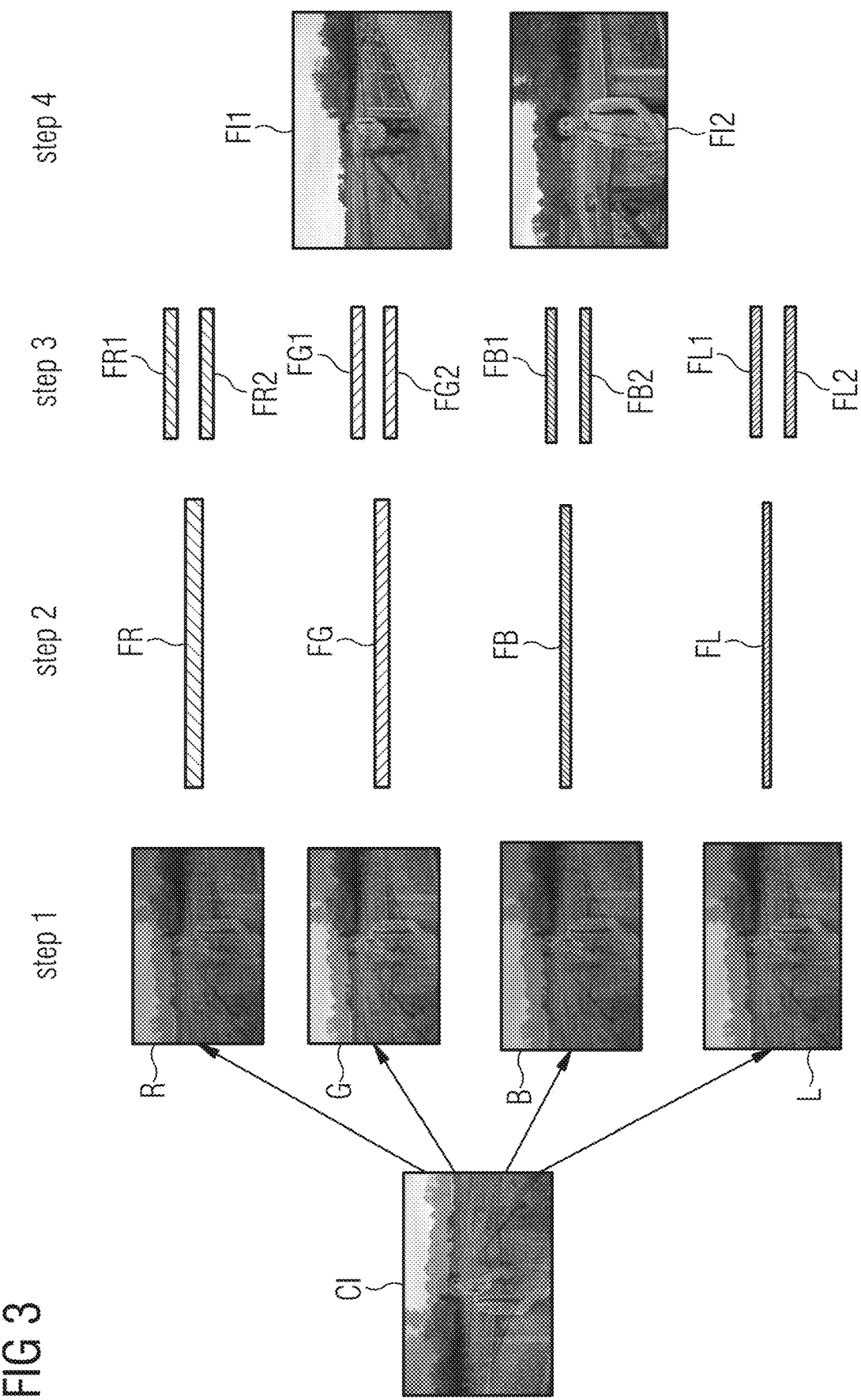

FIG 4
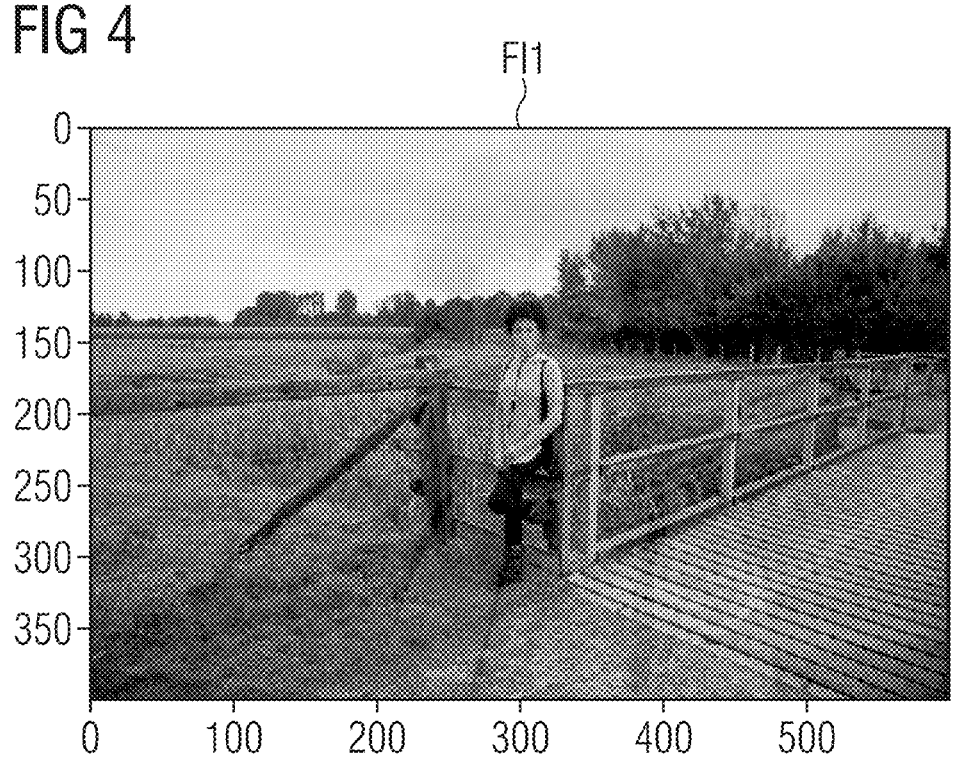

CAMERA SYSTEM, MOBILE DEVICE AND METHOD OF OPERATING A MOBILE DEVICE FOR MULTI-FOCUS IMAGING

CROSS-REFERENCE TO RELATED APPLICATIONS

The present application is a national stage entry from International Application No. PCT/EP2021/082669, filed on Nov. 23, 2021, published as International Publication No. WO 2022/106720 A1 on May 27, 2022, and claims priority to German Patent Application No. 10 2020 130 873.6, filed Nov. 23, 2020, the disclosures of all of which are hereby incorporated by reference in their entireties.

FIELD OF DISCLOSURE

This disclosure relates to aspects of a camera system, mobile device and method of operating a mobile device for multi-focus imaging.

BACKGROUND

Modern mobile devices, such as smartphones and tablets, are equipped with increasingly sophisticated imaging systems. High-end systems such as top-shelf smartphones use more than a single camera system to enable wide-angle, normal and telephoto range. However, these systems come with a considerable price tag as they demand a dedicated camera system for each focal range. This may not be an issue for top-shelf products, but there is an increasing need for lower-priced yet versatile mobile devices.

It is an object of the present disclosure to provide a camera system, a mobile device and a method of operating a mobile device for multi-focus imaging with multiple focal lengths using a single image sensor.

These objectives are achieved by the subject-matter of the independent claims. Further developments and embodiments are described in the dependent claims.

It is to be understood that any feature described in relation to any one embodiment may be used alone, or in combination with other features described herein, and may also be used in combination with one or more features of any other of the embodiments, or any combination of any other of the embodiments unless described as an alternative. Furthermore, equivalents and modifications not described below may also be employed without departing from the scope of the camera system, mobile device and method of operating a mobile device for multi-focus imaging which are defined in the accompanying claims.

SUMMARY

The following disclosure relates to an improved concept in the field of imaging. The improved concept suggests a camera system with a multi-focus lens having multiple focal lengths, e.g. wide-angle and telephoto. A single image sensor produces a combined image of different focal lengths. The image sensor receives different images that overlay at an image plane of the sensor. Digital signal processing is used to separate the combined image into single focal length images.

In at least one embodiment a camera system comprises a multi-focus lens, an image sensor and an image processor. The multi-focus lens has a first focal length and a second focal length. The image processor is arranged downstream of the multi-focus lens.

In operation, the image sensor generates a combined image according to the first and second focal length of the multi-focus lens. The image processor receives the combined image and separates the combined image into a first image of the first focal length and a second image of the second focal length.

In prior art solutions, such as high-end mobile phones, a dedicated camera system is used to enable wide range, normal range and further telephoto range, for example. The proposed concept, however, allows for the use of just a single camera system for combined imaging. The proposed single camera system with just a single image sensor gives a similar result as much more expensive multi-sensor camera systems. Thus the need for dedicated camera systems is reduced, e.g. by a factor of two for a dual focus lens, a factor of three for a triple focus lens, and so on. The proposed camera system can be used for mobile phone cameras but also on instant cameras with fixed lens construction, for example.

In at least one embodiment the multi-focus lens comprises a concentric lens. The concentric lens comprises at least two surfaces whose centers of curvature coincide. At least two surfaces have the first focal length and/or the second focal length, respectively.

Concentric lenses provide a convenient and relatively easy to manufacture multi-focus lens. For example, diffractive lenses employ closely spaced concentric rings on one of the lens surfaces to split incoming light into multiple beams. The beams may add together in phase at a predetermined point on the optical axis for the first focal length (e.g. wide-angle), while the overall curvature of the lens provides the second focal length (e.g. telephoto), or vice versa. Spacing and number of rings, as well as their step heights, can be adjusted to the desired focal ranges.

Refractive lenses are alternative concentric lenses which make use of zones of different optical powers to provide different focal lengths with a single lens. Designs include bifocal lenses, which present two simultaneous images, for example. Furthermore, multiple annular zones of alternating distance.

In at least one embodiment the multi-focus lens comprises an aspheric lens. The aspheric lens has a surface profile comprising at least a first section and a second section. The first section determines the first focal length and the second section determines the second focal length. The surface profile of aspheric can be adjusted with a comparably large degree of freedom. This may come at the expense of more complex manufacturing.

In at least one embodiment the multi-focus lens comprises a segmented lens. The segmented lens comprises a first segment and a second segment. The first segment determines the first focal length and the second segment determines the second focal length. The segments of segmented can be adjusted with a comparably large degree of freedom. This may come at the expense of more complex manufacturing.

In at least one embodiment the multi-focus lens is arranged as a dual curvature lens compound or as a hybrid dual focus lens. Examples include bifocal convex lenses and multi-focal Fresnel lenses. These types can be considered a special form of concentric lenses that lend themselves to cost-effective manufacture.

In at least one embodiment the multi-focus lens is arranged as a camera lens. Implemented as a camera lens a single multi-focus may suffice to create the combined image at the image sensor. This situation can be compared with a regular camera which employs a fixed or interchangeable camera lens. The camera lens may comprise a single lens as a multi-focus lens or a system of several optical lens elements. These elements provide multiple foci but may also complement the camera system to correct optical aberrations.

In at least one embodiment the multi-focus lens comprises at least one microlens and is arranged on the image sensor. A microlens combined with the image sensor can be manufactured in a considerably compact design. This may be beneficial for mobile devices which are often required to be small or packed with additional functional electronics sharing limited space.

In at least one embodiment, the multi-focus lens is configured as an array of microlenses. Each microlens of the array has at least the first focal length and the second focal length. Each microlens is arranged on a respective pixel or group of pixels of the image sensor. As the microlenses have more than one focal length they generate the combined image on a per-pixel or per-group basis. The image processor separates the combined image by means of dedicated image processing, for example. This allows employing the full resolution of the image sensor.

In at least one embodiment the multi-focus lens is configured as an array of microlenses. The microlenses of the array have the first focal length or the second focal length. Each microlens is arranged on a respective pixel or group of pixels of the image sensor. This implementation of the array allows partitioning the image sensor into different subarrays, e.g. a first and a second subarray. One image is focused on one subarray (e.g. the first subarray), the other image is focused on another subarray of pixels (e.g. the second subarray). This way separation of the combined image into separate images, e.g. the first and second image according to the first and second focal length), maybe a question of reading out subarrays. This, however, employs lower resolution, e.g. half resolution, of the image sensor.

In at least one embodiment the image sensor generates the combined images as a combined color image. In addition, or alternatively, the image sensor is operable to conduct digital signal processing to separate the combined images.

In at least one embodiment the multi-focus lens has at least a third focal length. The image sensor is operable to generate a combined image at least according to the first, second and third focal length. The image sensor is also operable to separate the combined image at least into the first image of the first focal length, and the second image of the second focal length and, finally, a third image of the third focal length.

In at least one embodiment, a mobile device comprises a camera system according to one or more aspects discussed above. Furthermore, the mobile device comprises a host system. The host system comprises a smartphone, a tablet, a photo camera or a video camera. Any kind of still camera or video camera can be used as a host system. For a video camera, however, the signal processing effort would be considerable but could be performed offline, e.g. by downloading the video and post-processing on an external computer.

In at least one embodiment a method of operating a mobile device for multi-focus imaging comprises the following steps. First, a combined image is generated at least according to a first and a second focal length. The combined image is taken using a multi-focus lens having at least the first focal length and the second focal length. An image sensor is arranged downstream of the multi-focus lens. Utilizing an image processor, the combined signal is received and separated into at least a first image of the first focal length and a second image of the second focal length.

In at least one embodiment the combined image is rearranged into at least one one-dimensional image. The one-dimensional image is then split into sub-images using a blind signal separation algorithm according to the first focal length and the second focal length. Finally, the sub-images of the first focal length and the second one-dimensional sub-image are recombined into the first image of the first focal length and a second image of the second focal length.

In at least one embodiment the image sensor generates the combined images as a combined color image. The combined image is rearranged into one-dimensional images according to the color channels of the image sensor. The splitting into sub-images through the blind separation algorithm occurs according to said color channels. Finally, the sub-images are recombined to yield color images according to the first focal length and the second focal length.

Further implementations of the method are readily derived from the various implementations and embodiments of the camera system and mobile device, and vice versa.

The following description of figures of example embodiments may further illustrate and explain aspects of the improved concept. Components and parts with the same structure and the same effect, respectively, appear with equivalent reference symbols. Insofar as components and parts correspond to one another in terms of their function in different figures, the description thereof is not necessarily repeated for each of the following figures.

BRIEF DESCRIPTION OF THE DRAWINGS

In the Figures:

FIG. 3 shows an example embodiment of a method of operating a mobile device for multi-focus imaging, and FIG. 4 shows an example result of multi-focus imaging.

DETAILED DESCRIPTION

Figure 1A:
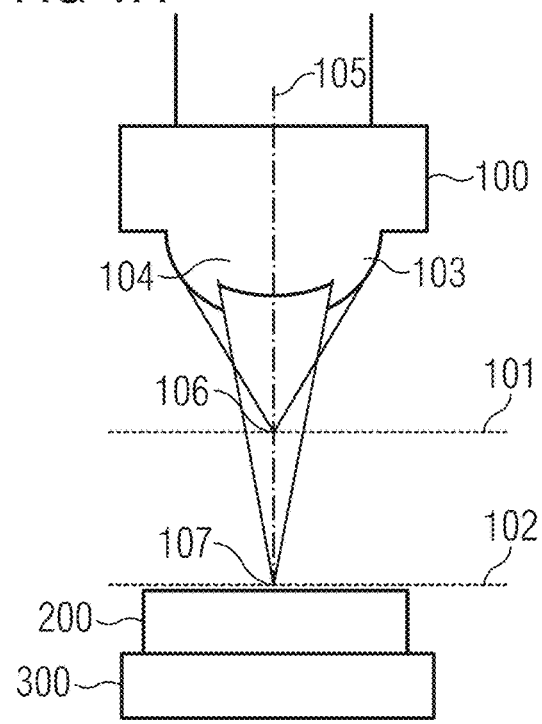
FIGS. 1A, 1B show an example embodiments of a camera system.
Figure 1B:
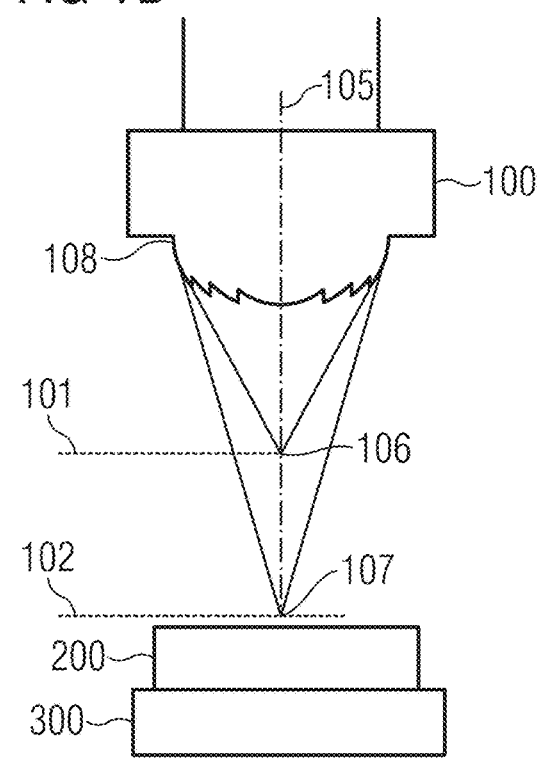

FIGS. 1A and 1B show example embodiments of a camera system. A camera system described hereinafter comprises a multi-focus lens 100 and an image sensor 200 which is arranged downstream the multi-focus lens. Furthermore, the camera system comprises an image processor 300.

The multi-focus lens 100 in this embodiment has a first and a second focal length 101, 102. In other embodiments, there may be even more focal lengths. In general, a multi-focus lens can be considered a lens that divides light into several focuses. The multi-focus lenses in FIGS. 1A and 1B may be considered representations of possible implementations. For example, a multi-focus lens can be implemented as a camera lens. As such the multi-focus lens is arranged to focus light to form images on the image sensor according to the first and second focal lengths 101, 102. In other words, the camera lens focuses light onto a first and second focal plane according to the first and second focal lengths 101, 102. A focal plane corresponds to a plane, perpendicular to the optical axis of the lens, in which images of points in the object field of the lens are focused.

The first and second focal length can be chosen as needed by the intended application. For example, the first focal length 101 can be a wide-angle focal length and the second focal length can be a telephoto focal length. Depending on the size of the image sensor this may translate into different values. The camera system can be implemented on different devices. In a smartphone a sensor size may be in the range of 1/2.55" and 1", a still camera may have any sensor size from micro 4/3, APS-C, full-frame or even more. As wide-angle and telephoto focal lengths are different for the different sensor sizes, the ranges are given for full-frame and can be translated into other sizes. Hereinafter for illustration purposes, only wide-angle focal length is set to 24 mm and telephoto focal length is set to 70 mm.

Furthermore, another aspect which may impact the optical properties of the multi-focus lens or lenses is the depth of focus. Depth of focus indicates the tolerance of placement of the image plane, e.g. focal planes of the image sensor, in relation to the multi-focus lens. Here, the depth of focus defines the distance over which one image plane can be displaced while the other image plane remains in acceptably sharp focus. The first and second focal lengths can be chosen to meet a desired depth of focus.

FIGS. 1A and 1B show two examples of a multi-focus lens. Both examples constitute concentric lenses. A concentric lens comprises surfaces whose centers of curvature coincide, e.g. with the optical axis of the lens. For example, one surface can be arranged to have the first focal length, while another surface can be arranged to have the second focal length. This concept may be extended to more than two focal lengths.

FIG. 1A shows a dual curvature lens compound. This multi-focus lens, in a certain sense, constitutes a juxtaposition of two spherical lenses. Accordingly, the multi-focus lens comprises a first spherical lens section 103 and a second spherical lens section 104 which are centered with respect to a common optical axis 105. The first spherical lens section 103 has a convex curvature according to the first focal length. The second spherical lens section 104 has a convex curvature according to the second focal length. The centers of said curvatures coincide in the common optical axis 105. Considered together, the resulting multi-focus lens provides the first and second focal lengths. Thus, an incoming beam of light is focused into a first focal point 106 (or first focal plane) and into a second focal point 107 (or second focal plane).

FIG. 1B shows a hybrid dual focus lens. This multi-focus lens, in a certain sense, constitutes a hybrid of two Fresnel lenses, or a multi-focal Fresnel lens 108. Such a multi-focal Fresnel lens provides multiple in- and out-of-focus images of a fixation target. The multi-focal Fresnel lens 108 comprises a set of concentric annular sections. This set is further divided into a first subset and a second subset which are centered with respect to a common optical axis 105. The first subset constitutes a Fresnel lens according to the first focal length. The second subset constitutes a Fresnel lens according to the second focal length. Considered together, the resulting multi-focal Fresnel lens 108 provides the first and second focal lengths. Thus, an incoming beam of light is focused into a first focal point 106 (or first focal plane) and into a second focal point 107 (or second focal plane).

The two embodiments in FIGS. 1A and 1B are two possible examples. Other examples include an aspheric lens or segmented lens. Such lenses may provide two or more focal lengths and, thus, can be used with the proposed camera system. For example, an aspheric lens has a defined surface profile. Typically, such a profile is also centered with respect to an optical axis. The surface profile often is represented as a function of the radius of curvature. In order to implement a multi-focus lens, the function (thus, the lens) may have a first section according to the first focal length and a second section according to the second focal length. Thus, an incoming beam of light is focused into a first focal point 106 (or first focal plane) and into a second focal point 107 (or second focal plane). In another example, the multi-focus lens comprises a segmented lens. The segmented lens comprises segments which do not necessarily have to be centered with respect to a common optical axis. The segments may even be of different materials or optical properties, such as index of refraction. For example, a first segment has the first focal length and a second segment has the second focal length. An incoming beam of light is focused into a first focal point 106 (or first focal plane) and into a second focal point 107 (or second focal plane).

In alternative embodiments, a multi-focus lens can be implemented as an array of micro-lenses, for example. In general, the micro-lenses may be single-focus or multi-focus lenses. In case of multi-focus micro-lenses, each micro-lens may be implemented in the same or similar manner as discussed above with respect to the camera lenses, e.g. as concentric, aspheric or segmented lenses. However, single-focus micro-lenses may only have a single focal length. In order to implement a multi-focus lens, the array of micro-lenses may comprise different groups of micro-lenses of different focal lengths, e.g. two groups with the first and second focal length, respectively, in order to implement a dual focus lens.

A micro-lens can be considered a small lens with a diameter less than 1 mm or even smaller than 10 μm. The micro-lenses are arranged with respect to pixels of the image sensor 200. For example, each micro-lens can be associated with a corresponding pixel of the image sensor. The micro-lenses may be arranged spaced to or directly on their corresponding pixels. Furthermore, a given micro-lens from the array may be implemented to have both the first and second focal lengths 101, 102. However, the array may also comprise micro-lenses of different focal lengths, e.g. a first group of micro-lenses each having the first focal length and a second group of micro-lenses each having the second focal length.

The image sensor 200 is arranged downstream to the multi-focus lens. When a scene is captured the image sensor generates a combined image according to the first and second focal lengths. The combined image comprises a first image according to the first focal length and a second image according to the second focal length. For example, the first image is a wide-angle image of the scene (e.g., at 24 mm focal length) and the second image is a telephoto image of the same scene (e.g., at 70 mm focal length). The combined image represents an overlay of both the first and second image. In order to separate the images, the combined image is subjected to image processing, e.g. DSP processing. This will be discussed in more detail below.

The processing takes place in the image processor 300. The image processor, such as a microprocessor, GPU or CPU, may be integrated together with the images sensor 200 into a common integrated circuit and/or a sensor module. The integrated circuit and/or a sensor module may be complemented with additional electronics to control operation, e.g. of image capture and processing. However, the image processor 300 may, at least in parts, be an external component, e.g. of a mobile device, and all or parts of the image processing may be executed externally.

Figure 2A:
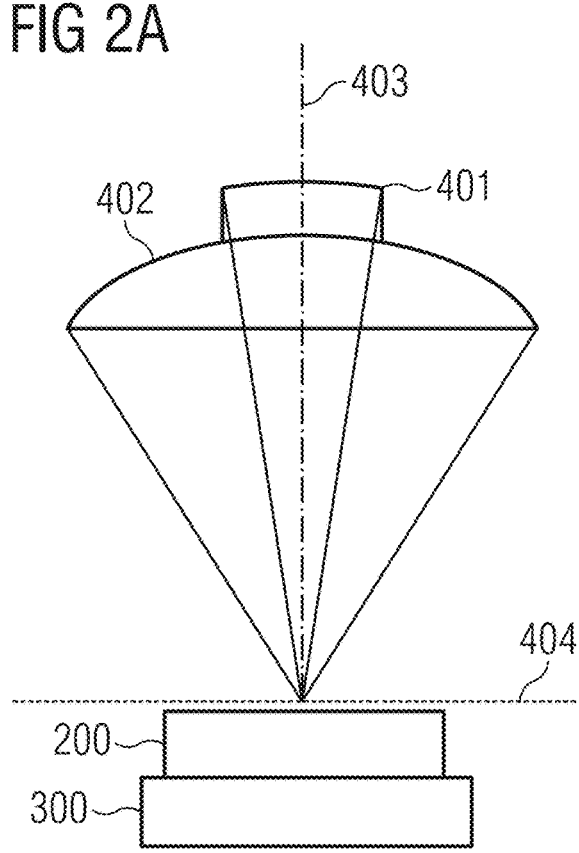
FIGS. 2A, 2B show an example embodiment of multi-focus lens.

FIG. 2A shows another example of a multi-focus lens. The drawing shows a cross-section of a multi-focus lens. The lens comprises a first segment 401 and a second segment 402. The second segment 402 has the shape of a circular plano-convex lens which faces the image sensor 200 with its plan surface. The second segment 402 determines the first focal length, e.g. wide angle range. The first segment 401 has the shape of a circular convex-concave or plano-concave lens and is arranged on the second segment 402. In this implementation the first segment 401 has the shape of a plano-concave lens and is arranged on a surface of the second segment 402 facing away the image sensor 200.

This embodiment constitutes an example of a combination of convex and concave segments, which ultimately are combined to yield the multi-focus lens. Other combinations and orientation of surfaces are possible as well, generally including bi-convex, plano-convex, concave-convex, plano-concave and/or bi-concave segments. Furthermore, there may be more than two segments involved. The lens construction can be expanded to a number of n lens segments with m focus levels with n=1, 2, 3, . . . and m=1, 2, 3, . . . and n>=m. The following table shows some possible lens segment to focus level combinations.

| n | m | lens segments | focus levels |
|---|---|---|---|
| 1 | 1 | 1 | 1 |
| 1 | 2 | 1 | — |
| 2 | 1 | 2 | 1 |
| 2 | 2 | 2 | 2 |
| 4 | 3 | 4 | 3 |

Figure 2B:
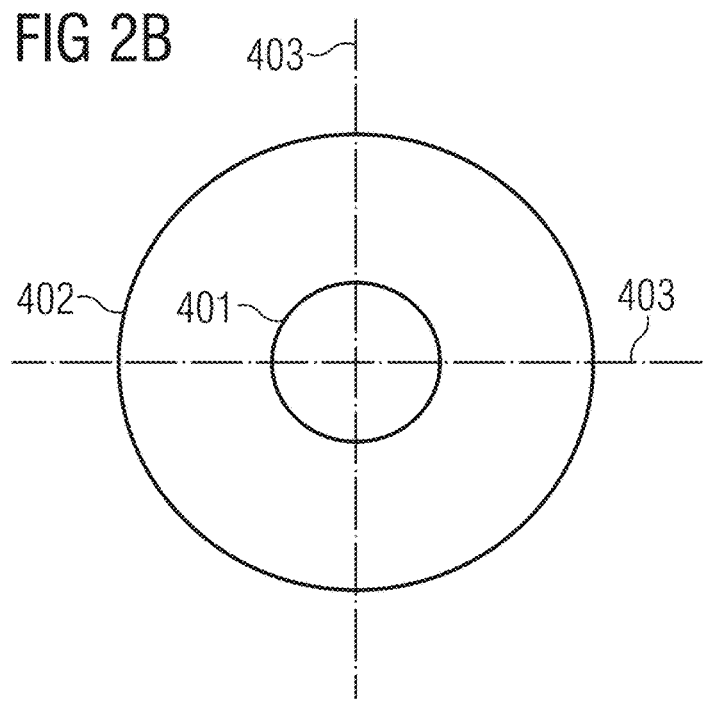

FIG. 2B shows a top view of the multi-focus lens shown in FIG. 2A. Both lens segments 401, 402 are concentric to each other, see also with respect to a symmetry axes 403.

The multi-focus lens of this embodiment constitutes a dual focus lens that is constructed in such a way that the focus lines of lens segment 401 (telephoto range) and lens segment 402 (wide angle range) intersect in the same focus level 404. The distance between the surfaces of lens segment 401 to lens segment 402 compensates for the different focus lengths. This way the construction does not have to account for a depth of focus as both first and second images are focused onto the same focus (or focal plane).

FIG. 3 shows an example embodiment of a method of operating a mobile device for multi-focus imaging. The image sensor receives the combined image CI according to the different focal lengths. The method described hereinafter separates the combined image into a first image of the first focal length and a second image of the second focal length (or further images if more than two focal lengths are implemented). The method can be executed on the image processor 300, e.g. by digital signal processing, DSP. In general, the processing applies to monochromatic or color images. For the following, it is assumed that the image sensor generates color images so that the combined images is a combined color image of several color channels, e.g. RGB channels.

In a first step, the combined image CI is split into a number of single-color images according to the color channels of the image sensor. For example, as a result of the first step, the combined image is split into a red image R, a green image G, a blue image B, and a greyscale image L. These split images have the same dimensions as the combined image, i.e. are two-dimensional images.

In a second step, the split images, i.e. images RGB and L, are rearranged, or fractioned, into corresponding one-dimensional images according to the color channel, e.g. denoted fractioned red image FR, fractioned green image FG, fractioned blue image FB, and fractioned greyscale image FL. For example, each pixel of single-color images gets lined up side by side to yield the fractioned images.

In a third step, the fractioned images are subjected to a blind signal separation algorithm. The algorithm processes the fractioned images according to the first focal length and a second image of the second focal length, for example, but can be extended to further focal lengths. The blind signal separation algorithm is adapted from the known cocktail party problem, where one voice has to be filtered out to follow a conversation. The adaption of the algorithm involves Joint Approximation Diagonalization of Eigen matrices, JADE, based on independent component analysis, ICA.

The third step results in a set of fractioned sub-images corresponding one-dimensional color channel images according to the first and second focal length. For example, there are two fractioned red sub-images FR1 and FR2 according to the first and second focal length, respectively. Similarly, there are fractioned green sub-images FG1, FG2, fractioned blue sub-images FB1, FB2, and fractioned greyscale sub-image FL1, FL2, according to the first and second focal length, respectively.

In a fourth step, the fractioned sub-images of the first focal length and the fractioned sub-images of the second focal length are recombined to yield single-color images according to the color channels. For example, this step yields a recombined red image of the first focal length and a recombined red image of the second focal length. Similarly, the fourth step yields recombined green, blue and greyscale images of the first focal length and recombined green, blue and greyscale images of the first focal length of the second focal length. These images are two-dimensional again. The recombined color channel images are combined to yield final color images FI1 and FI2. The final color images FI1 and FI2 correspond to single images of the first and second focal length, respectively.

In another embodiment (not shown) the multi-focus lens is configured as an array of microlenses. The microlenses of the array have the first focal length or the second focal length. Each microlens is arranged on a respective pixel or group of pixels of the image sensor. Furthermore, the image sensor comprises different subarrays, e.g. a first and a second subarray. Pixels from the first subarray are associated with microlenses of the first focal length. Pixels from the second subarray are associated with microlenses of the second focal length.

This way one image is focused on the first subarray and another image is focused on the second subarray. Separation of the combined image into separate images, e.g. the first and second image according to the first and second focal length), can be achieved by reading out the pixels from the corresponding subarrays. This, however, employs lower resolution, e.g. half resolution, of the image sensor.

FIG. 4 shows an example result of multi-focus imaging after one software algorithm iteration. Each iteration improves the quality of the image separation. The drawing shows a first image on the left side and a second image on the right side (for example grayscale). Some experiments came to the result that a challenge is the separation of two images, which are similar to each other. Processing may be easier if images are generated with large different focal lengths. In general, the procedure can also be used for the detection of paintings below other paintings after x-ray image scanning.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

A number of implementations have been described. Nevertheless, various modifications may be made without departing from the spirit and scope of the invention. Accordingly, other implementations are within the scope of the claims.

The invention claimed is:

1. A camera system, comprising:
   a multi-focus lens having a first focal length and a second focal length;
   an image sensor arranged downstream the multi-focus lens and being operable to generate a combined image according to the first focal length and the second focal length; and
   an image processor operable to receive the combined image and separate the combined image into a first image of the first focal length and a second image of the second focal length, wherein the combined image represents an overlay of both the first and the second image,
   wherein the multi-focus lens comprises an aspheric lens,
   the aspheric lens has a surface profile comprising at least a first section and a second section, and
   the first section determines the first focal length and the second section determines the second focal length.

2. The camera system according to claim 1, wherein the multi-focus lens is arranged as a camera lens.

3. The camera system according to claim 1, wherein
   the image sensor generates the combined images as a combined color image, and
   the image processor is operable to conduct digital signal processing to separate the combined images into the first image of the first focal length and the second image of the second focal length.

4. The camera system according to claim 1, wherein
   the multi-focus lens has at least a third focal length,
   the image sensor is operable to generate a combined image at least according to the first focal length, the second focal length, and the third focal length, and
   the image processor is operable to separate the combined image at least into the first image of the first focal length, the second image of the second focal length and a third image of the third focal length.

5. A mobile device, comprising:
   a camera system according to claim 1,
   a host system comprising one of:
   a smartphone, a tablet, a photo camera or a video camera.

6. A method of operating a mobile device according to claim 5 for multi-focus imaging, comprising:
   generating a combined image at least according to the first focal length and the second focal length, wherein the combined image is taken using a multi-focus lens having at least the first focal length and the second focal length and an image sensor arranged downstream the multi-focus lens, and by means of an image processor;
   receiving the combined image; and
   separating the combined image at least into a first image of the first focal length and a second image of the second focal length.

7. The method according to claim 6, wherein
   the combined image is rearranged into at least one one-dimensional image,
   the one-dimensional image is split into sub-images by means of a blind signal separation algorithm according to the first focal length and a second image of the second focal length, and
   the sub-images of the first focal length and the sub-images of the second focal length are recombined into the first image of the first focal length and the second image of the second focal length.

8. The method according to claim 7, wherein the image sensor generates the combined image as a combined color image, and wherein:
   the combined image is rearranged into one-dimensional color images according to color channels,
   splitting into sub-images by means of the blind signal separation algorithm according is performed separately for the one-dimensional color images according to yield one-dimensional color sub-images and
   the color sub-images are recombined to yield color images according to the first focal length and the second focal length.

9. A camera system comprising:
   a multi-focus lens having a first focal length and a second focal length;
   an image sensor arranged downstream the multi-focus lens and being operable to generate a combined image according to the first and second focal lengths; and
   an image processor operable to receive the combined image and separate the combined image into a first image of the first focal length and a second image of the second focal length, wherein
   the combined image represents an overlay of both the first and the second image;
   the multi-focus lens has at least a third focal length,
   the image sensor is operable to generate a combined image at least according to the first focal length, the second focal length, and third focal length, and
   the image processor is operable to separate the combined image at least into the first image of the first focal length, the second image of the second focal length and a third image of the third focal length.

10. The camera system according to claim 9, wherein
    the multi-focus lens comprises a concentric lens,
    the concentric lens comprises at least three surfaces whose centers of curvature coincide, and
    at least three surfaces determine the first focal length, the second focal length, and the third focal length, respectively.

11. The camera system according to claim 9, wherein
    the multi-focus lens comprises an aspheric lens,
    the aspheric lens has a surface profile comprising at least a first section, a second section, and a third section, and
    the first section determines the first focal length, the second section determines the second focal length, and the third section determines the third focal length.

12. The camera system according to claim 9, wherein
the multi-focus lens comprises a segmented lens,
the segmented lens comprises a first segment, a second segment, and a third section, and
the first segment determines the first focal length, the second segment determines the second focal length, and the third section determines the third focal length.

13. The camera system according to claim 9, wherein the multi-focus lens comprises at least one micro-lens and is arranged on the image sensor.

14. The camera system according to claim 13, wherein
the multi-focus lens is configured as an array of microlenses,
each microlens of the array has at least the first focal length, the second focal length, and the third focal length, and
each microlens is arranged on a respective pixel or group of pixels of the image sensor.

15. The camera system according to claim 13, wherein
the multi-focus lens is configured as an array of microlenses,
the microlenses of the array have the first focal length, or the second focal length, or the third focal length, and
each microlens is arranged on a respective pixel or group of pixels of the image sensor.

* * * * *